United States Patent [19]

Jackson et al.

[11] 4,284,362
[45] Aug. 18, 1981

[54] PRINTER CONTROL LOGIC

[75] Inventors: Timothy Jackson, Coral Springs; Charles D. Malkemes; William L. Zipoy, both of Boca Raton, all of Fla.

[73] Assignee: International Business Machines Corp., Armonk, N.Y.

[21] Appl. No.: 62,254

[22] Filed: Jul. 30, 1979

[51] Int. Cl.³ .............................................. B41J 3/12
[52] U.S. Cl. .................................. 400/124; 364/900; 400/323
[58] Field of Search ... 364/200 MS File, 900 MS File; 400/61, 62, 70, 124, 121, 320, 322, 323

[56] References Cited

U.S. PATENT DOCUMENTS 4,146,922 3/1979 Brown et al. .................... 400/320 X
4,147,967 4/1979 Aiena .............................. 400/320 X

FOREIGN PATENT DOCUMENTS

2516835 10/1976 Fed. Rep. of Germany .......... 400/124

Primary Examiner—Paul T. Sewell
Attorney, Agent, or Firm—Harry W. Barron; John C. Black; J. Jancin, Jr.

[57] ABSTRACT

There is disclosed herein printer control logic for controlling a matrix printer. The control logic includes an interruptable microprocessor, together with associated memory. Additionally the control logic includes a programmable timer which provides a signal a determined time after being programmed. The control logic responds to print emitter signals manifesting an incremental movement of the print head by interrupting the microprocessor. The microprocessor then programs the timer to provide signals after a programmed delay time to again interrupt the microprocessor. The microprocessor then provides signals causing the operation of the print elements on print head.

28 Claims, 8 Drawing Figures

PRINTER CONTROL LOGIC

This invention relates to printer control logic and, more particularly, to printer control logic utilizing an interruptable microprocessor for programming a timer to control the operation of printer elements of a matrix printer.

Matrix printers, such as wire matrix printers, ink jet printers and thermo printers are well known in the art. Typical of the matrix printers is the wire matrix printer which includes a print head having a plurality of, for example, eight wires positioned in a vertical column on the print head. The printer includes means for moving the print head laterally across a record medium, such as paper, which has been inserted in the printer.

Each of the print wires of the print head has an associated actuator, such as a solenoid connected to the end thereof opposite from the paper. The actuators may be energized to cause the print wires to move forward and by positioning ribbon means between the wires and the record medium, dots can be printed on the medium each time an actuator is energized. By selectively actuating appropriate actuators as the print head moves across the paper, information, such as alphanumeric characters or graphical information, can be printed on the record medium in a well known manner.

As the print head moves laterally across the record medium, control signals from a print emitter system are provided to indicate the direction of movement of the print head and its precise position along the lateral path that it moves. These print emitter signals are detected by the control circuits and may be used to align the printed dots in desired positions. Typically, an emitter pulse signal is provided for each 0.010 inch (25 millimeters) of print head movement, and the dots are printed in response to these pulse signals to afford vertical alignment of the characters from line to line.

In prior art print printer control circuits, microprocessor means have been utilized to detect the print emitter system signals by polling techniques, that is, the microprocessor continually monitors the print emitter system signals looking for a new pulse. Upon detecting a new pulse, the microprocessor transmits signals to cause the appropriate print wire actuators to be energized. In order to maintain an even spacing between the characters and to maintain a good vertical alignment from line to line of the characters, especially in printer systems in which one row of characters is printed on the left to right movement of the print head and a second different row of characters is printed on the subsequent right to left movement of the print head, it is necessary to control the actuation of the print wire actuators very closely. This entails inserting a short delay between the actual detection of a print emitter signal and the provision of a signal to the actuators. This delay time in the past has been accomplished by allowing a certain number of cycles times of the microprocessor to elapse prior to providing the actuator signals. Control means of the type described herein is more fully explained in U.S. Pat. No. 4,096,578, entitled "Data System With Microprocessor Featuring Multiplexed Data Transfer and Repeat Cycle Driving Arrangements", in the name of Charles D. Malkemes, which patent is assigned to the present assignee.

One problem with the microprocessor control techniques previously used for printer controllers is the tremendous waste of microprocessor power due to (1) the necessity of continually polling the print emitter system looking for print emitter signals, and (2) the utilization of the microprocessor's internal cycle times to arrive at the appropriate delay period prior to providing the actuator signals.

In accordance with one aspect of this invention, there is provided control means for a printer having a matrix print head which moves across a record medium. The print head prints information on the medium by selective operation of the print elements of the print head. The control means comprises means for providing positioning signals at periodic interim positions as the print head moves across the medium, and interruptable processor means responsive to the positioning signals for being interrupted to provide a control signal to selectively operate the print elements after being interrupted.

In accordance with a second aspect of this invention, there is provided control means for a printer having a matrix print head which moves across a record medium. The print head prints information on the medium by selective operation of the print elements of the print head. The control means comprises means for providing positioning signals at periodic interim positions as the print head moves across the medium. In addition, the control means include programmable timer means and processor means responsive to the positioning signals for programming the timer means to provide signals after a given time to selectively cause the operation of the print elements.

One preferred embodiment of the present invention will hereafter be described with specific reference being made to the following figures in which.

Figure 1:
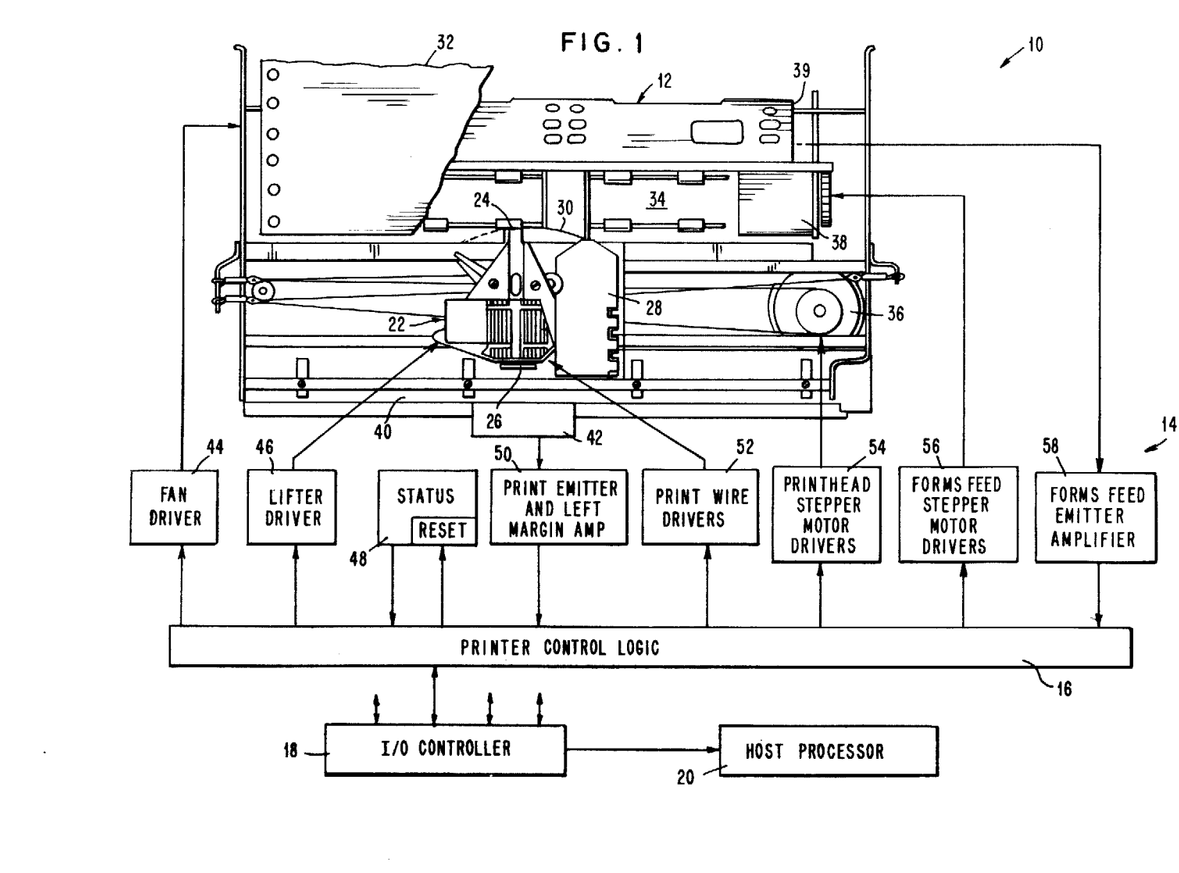
FIG. 1 illustrates, partially in block format, a printer system utilizing the present invention.

Referring now to FIG. 1, printer system 10 is shown and includes a printer 12 and printer electronics 14. In addition, there is associated with printer system 10, printer control logic 16 which is coupled through input/output (I/O) controller 18 to a host processor 20. Printer 12 may be a modified IBM Model 3715 Wire Matrix Printer which is manufactured and sold by International Business Machines Corp. of Armonk, N.Y. Host processor 20 may be an IBM Series/1 Processor, several models of which are available from International Business Machines Corp. I/O controller 18 is described in detail in co-pending U.S. Patent Application Ser. No. 062263 entitled "High Performance I/O Controller for Transfering Data Between a Host Processor and Multiple I/O Units", with the inventors being J. M. Dinwiddie et al, having a filing date the same as the subject application. No detailed description will be given herein for I/O controller 18, reference being made to the above-noted Patent Application Ser. No., 062263, which is incorporated herein by reference in its entirety. The modification to printer 12 over the Model 3715 is providing a tilting print head 22, which is described in detail in co-pending U.S. Patent Application Ser. No. 062259 in the names of J. M. Choberka et al and entitled "Dot Matrix Print Head", which application has a filing date the same as that of the subject application. The print head of the Choberka et al application is a conventional wire matrix print head which can be tilted by an amount equal to one-half the center-to-center spacing between the print wires to facilitate printing between previously printed dots. The details of construction of print head 22 will not be given herein, reference being made to the above-noted Application Ser. No. 062259, which is hereby incorporated by reference in its entirety. It should be noted, however, that print head 22 includes eight wires aligned in a vertical row at its front end 24. Each of the wires has an associated actuator, located at the back end 26 of print head 22, which is energized by appropriate signals from printer electronics 14 to move that wire forward causing it to strike ribbon 30, which is positioned in front of print head 22. Ribbon 30 is forced to contact record medium 32 against platen 34. When the wire returns to its home position, a dot is left on record medium 32.

Print head 22 is controlled by print head stepper motor 36 and associated connecting means to move in either the left to right direction or the right to left direction across record medium 32. During this movement, appropriate actuators may be energized to cause dots to be printed on record medium 32, leaving printed information thereon. Record medium 32 is moved forward by forms feed stepper motor 38 in a known manner to allow individual lines of characters to be printd on record medium 32. As the medium 32 moves, forms feed emitter signals are provided from forms feed emitter system 39 in a known manner.

Printer 12 also includes a conventional print emitter system including print emitter 40 and print emitter detector 42. Print emitter 40 may be a series of closely spaced detectable members positioned along the entire movement path of print head 22. Print emitter detector 42 is coupled to print head 22 to move with it across print emitter 40 and to provide a signal for each incremental movement of print head 22; in other words, as print head 22 moves from one interim position to the next interim position, a signal is provided from print emitter detector 42. The detectable members of print emitter 40 may be spaced apart by 0.030 inches (76 millimeters) and print emitter detector 42 may include three separate detectors arranged to provide a signal for each 0.010 inches (25 millimeters) of movement of print head 22 and print emitter detector 42 across print emitter 40.

Printer electronics 14 includes fan driver 44, lifter driver 46, printer status 48, print emitter and left margin amplifier 50, print wire drivers 52, print head stepper motor drivers 54, forms feed stepper motor drivers 56 and forms feed emitter amplifier 58. Each of these circuits 44–58 (even numbers only) either provide signals to or receive signals from printer control logic 16 and operate on a specific part of printer 12 in a known manner. For instance, fan driver 44 receives a signal from printer control logic 16 and provides a signal to printer 12 to either turn on or turn off the fan, depending on the signal received from logic 16. Print emitter and left margin amplifier 50 on the other hand receives signals from print emitter detector 42 and provides signals to printer control logic 16. The remaining circuits 44–58 (even numbers only) operate in a similar and known manner for controlling various portions of printer 12.

Figure 2:
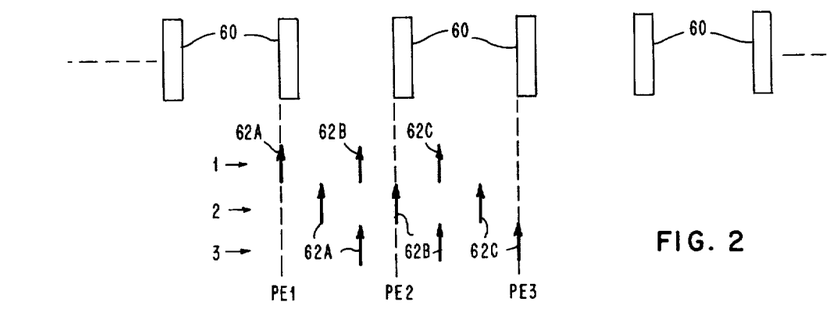
FIG. 2 illustrates the operation of the emitter system of the print system shown in FIG. 1.

Referring now to FIG. 2, the operation of print emitter 40 and print emitter detector 42 will be explained. FIG. 2 is a schematic representation of how print emitter 40 and print emitter detector 42 operates. The print emitter elements 60 are positioned on print emitter 40, and equally spaced apart by 0.030 inches. Print emitter detector 42 includes three print emitter detector pickup elements 62a, 62b and 62c, which are positioned apart in such a manner that for each 0.010 inch movement of print head 22, only one of the pickup elements 62a, 62b and 62c will be aligned with a print emitter elements 60. In other words, each of the pickup elements 62a, 62b and 62c are separated by N times the print emitter element 60 separation plus 0.020 inches, where N may be any integral number. Schematically, as shown in FIG. 2, N is made equal to zero, so the pickup element 62a, 62b and 62c are separated by 0.020 inches, although in practice spacing the pickup element 62a, 62b and 62c this close together on print emitter detector 42 would not be done. In FIG. 2, three positions, designated as 1, 2 and 3, of the print emitter detector 42 and, hence, print head 22 are shown vertically aligned. In position 1, pickup element 62a is in alignment with one of the print emitter element 60, thereby causing a signal, designated PE1, to be provided from print emitter detector 42. The other two pickup elements 62b and 62c are not aligned with any of the print emitter elements 60 and, thus, do not provide any signals. In position 2, which shows movement of print head 22 by 0.010 inches to the right, pickup element 62b is aligned with one of the print emitter elements 60 thereby causing the PE2 signal to be provided from print emitter detector 42. In position 3, which shows a second 0.010 inch movement of print head 22 to the right, pickup element 62c is aligned with one of the print emitter elements 60, thereby causing the PE3 signal to be provided. This process is continually repeated so that for each 0.010 inch movement of print head 22, one of the print emitter detector 42 signals, PE1, PE2, or PE3, is provided. These signals can be utilized by printer control logic 16 as timing signals to determine when to print dots on record medium 32 as well as by observing the order of the provision of the signals to determine the direction of movement of print head 22.

Figure 3:
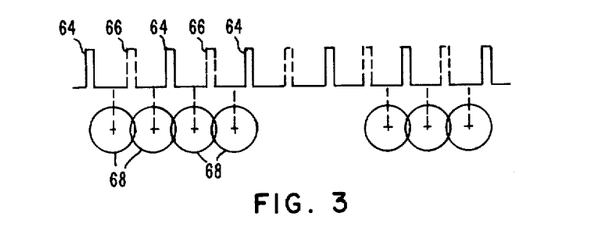
FIG. 3 illustrates the printing of dots on a record medium using the information generated by the print emitter system.

Referring to FIG. 3, the printing of dots in response to the print emitter signals PE1, PE2, and PE3, is shown. In FIG. 3, print emitter pulse 64 are shown as solid lines with a dotted line pseudo printer emitter pulse 66 shown between each real print emitter pulse 64. When printing the dots 68, adjacent dots are printed to just overlap in one mode of printing of printer system 10. A convenient way to print dots with printer system 10 is to print dots where desired in response to each print emitter pulse 64 or pseudo print emitter pulse 66, thereby causing them to just overlap and form a solid line.

Figure 4:
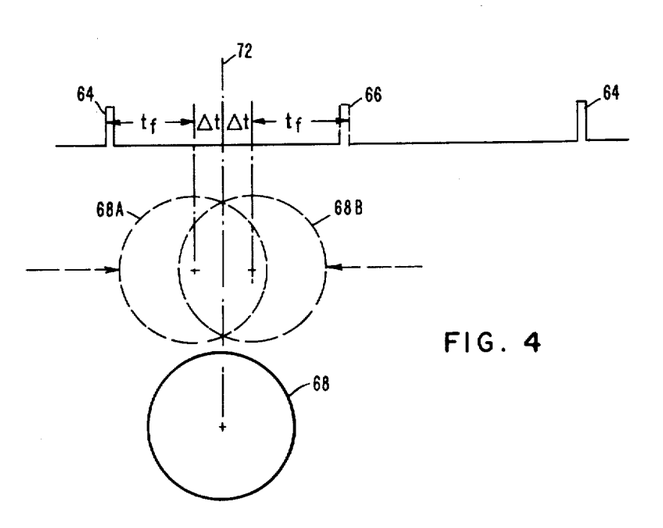
FIG. 4 illustrates the necessity of adding a Δt time in determining when to provide an actuator signal.

Referring now to FIG. 4, it should be noted that the dots 68 can be printed as print head 22 is moving in either the left to right direction or the right to left direction. A finite time $t_f$ is required between the time the signal actuating the print wire actuators is sent and the time the actual dot 68 is printed. This time is primarily due to the time required to move the print wire from its home position on the front end 24 of print head 22 to a position against platen 34. As shown in FIG. 4, the time $t_f$ is less than one-half the distance between a print emitter pulse 64 and a pseudo print emitter pulse 66. Thus, if print head 22 is moving in the left to right direction and a signal is sent to cause a dot to be printed upon detecting pulse 64, then a dot 68A will be printed at a position to the left of the center line 72 between pulses 64 and 66. On the other hand, if print head 22 is moving in the right to left direction, dot 68B will be printed to the right of line 72. In order to obtain a dot 68 in the same position in alignment with line 72, a delay of $\Delta t$ should be provided between the detection of one of the pulses 64 or 66 and the provision of a signal to actuate the wire actuators in printer head 22.

Figure 5:
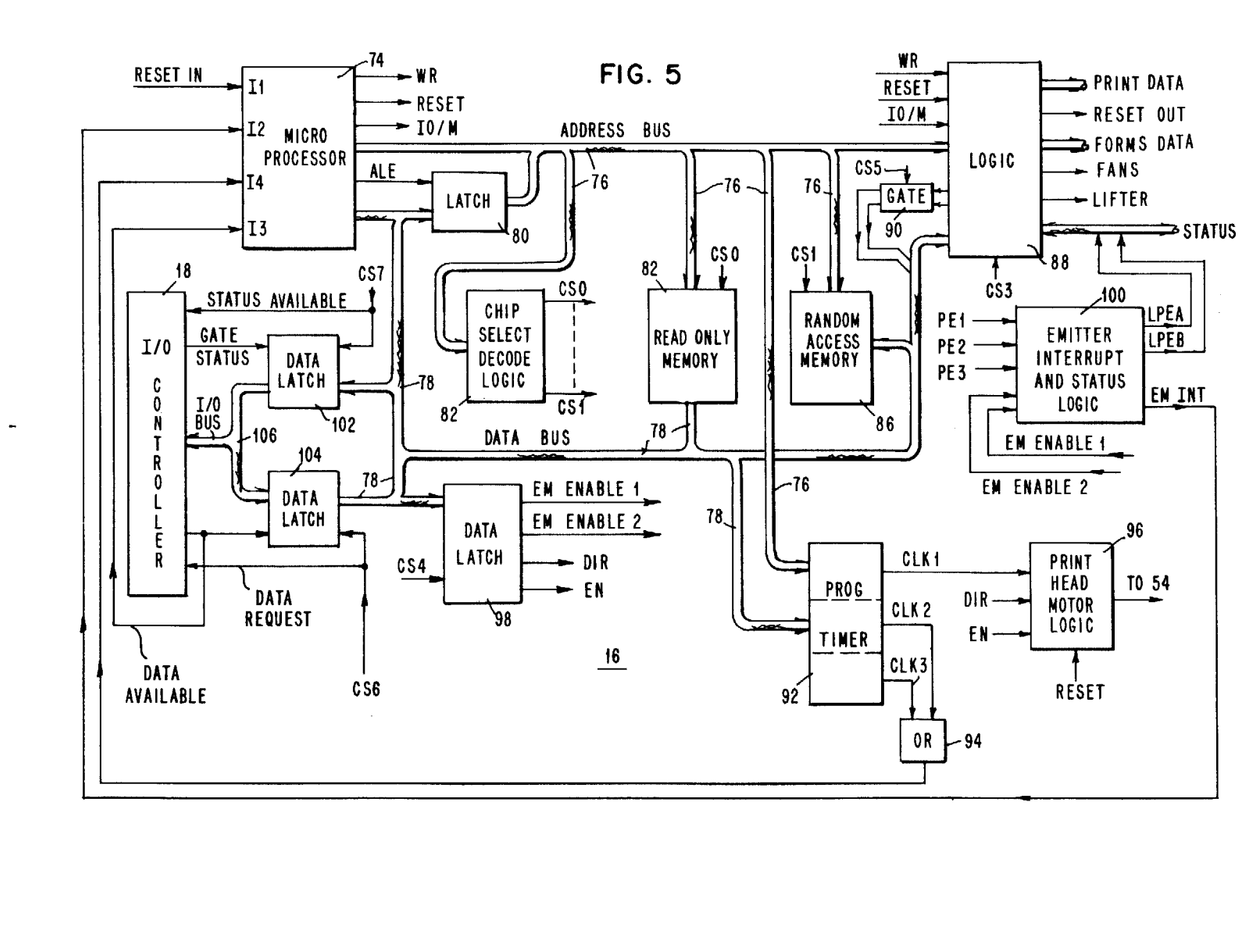
FIG. 5 illustrates, in block format, the printer controller of the subject invention.

Referring now to FIG. 5, control logic 16 is shown in detail. Control Logic 16 includes microprocessor 74 which may be an Intel 8085 microprocessor manufactured and sold by Intel Corp. of Santa Clara, California. Reference is hereby made to the "MCS-85 Users Manual", January, 1978, published by Intel Corp. for a description of microprocessors 74. Microprocessors 74 is an interruptable microprocessor which has four interrupt inputs, I1, I2, I3 and I4, which are prioritized in that order. Normally microprocessor 74 will be executing a program and providing data and address signals in a known manner. However, if a signal is provided to one of the interrupt inputs I1, I2, I3, or I4, the execution of the program then being done will cease and a jump will occur to cause execution of a special program associated with the particular interrupt input. Microprocessor 74 also provides a write signal WR, a reset signal RESET an IO/M signal and an ALE signal in a known manner. In addition, an output of microprocessor 74 is coupled to the address bus 76 and to the data bus 78. Data bus 78 is coupled through latches 80, to which the ALE signal is provided, to form the low order eight bits of the 16 bit address bus 76.

Address bus 76 provides address signals to chip select decode logic 82, read only memory 84 and random access memory 86. Chip select decode logic 82 responds to three of the sixteen lines on address bus 76 and provides one of eight chip select signals CS0 through CS7. Each of the chip select signals CS0 through CS7 are provided to a different module within printer control logic 16 to enable that module to respond to other signals. For instance, chip select signal CS0 is applied to read only memory 84 to enable read only memory 84 to respond to the signals on address bus 76, addressing a specific location therein. The data in that addressed location is then provided at the output of read only memory 84 to data bus 78. Random access memory 86 operates in response to the CS1 signal in a similar manner when reading information therefrom. When it is desired to write information into random access memory 86, the CS1 signal, together with other signals from microprocessor 74 (not shown), are provided to cause the data on data bus 78 to be written into the address locations of random access memory 86.

Address bus 76 is also coupled to general logic 88. Logic 88 is enabled by the CS3 signal from chip select decode logic 82 and provides a plurality of logic functions which will be described in more detail hereafter with respect to FIG. 8. However, it should be noted at this point that logic 88 corresponds quite closely to the logic described in the above-mentioned U.S. Pat. No. 4,096,578, to which reference is hereby made and which patent is hereby incorporated by reference in its entirety. Logic 88 also responds to signals appearing on data bus 78 as well as the WR, RESET and IO/M signals from microprocessor 74. In general, logic 88 includes logic elements for providing the PRINT DATA signals to print wire driver 52, the FORMS DATA signals to forms feed stepper motor drivers 56, the FAN and LIFTER signals to the fan and lifter drivers 44 and 46, and a RESET OUT signal to reset printer 12. In addition, logic 88 responds to the status signals provided from printer 12. Associated with logic 88 is gate means 90, which in response to the CS5 enabling signal, gates two lines from logic 88 to the data bus 78. These lines are used to read two of the status signals at one time provided to logic 88 and provide these two signals over lines D6 and D7 of data bus 78 in response to appropriate address signals applied to logic 88 and the IO/M signal.

Address bus 76 and data bus 78 are also provided to programmable timer 92, which is enabled by the CS2 signal from chip select decode logic 82 to respond to the signals on the data bus 78 and address bus 76. Programmable timer 92 which may be an Intel 8253 programmable interval timer, includes three portions which may be independently programmed in a number of different modes, including the delay mode for providing a signal a fixed time after being programmed and the real time clock mode for providing a continuous train of signals having a specific frequency, where the time period of the frequency is programmed. In the case of programmable timer 92, the first or upper portion is programmed to provide the CLK 1 signal as a train of pulses having a specific frequency and the second and third portions provide the CLK 2 and CLK 3 signals at specific times after being programmed.

The CLK 2 and CLK 3 signals from the second and third portions of programmable timer 92 are provided as two inputs to OR gate 94. The output of OR gate 94 is coupled to the I4 interrupt input of microprocessor 74 to indicate to microprocessor 74 that it is time to cause the PRINT DATA signals to be provided by logic 88 to actuate the print wires.

Figure 7:
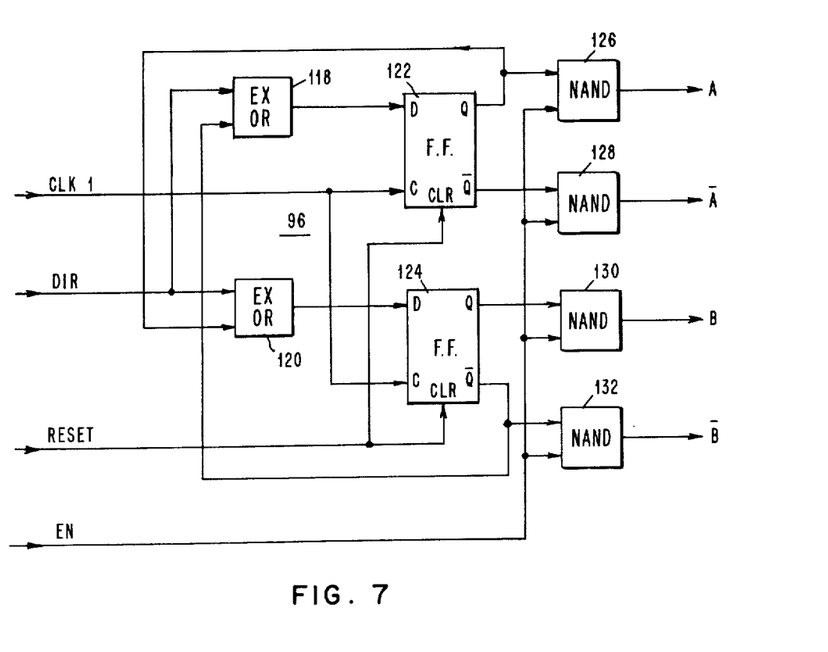
FIG. 7 illustrates the print head motor logic shown in FIG. 5.

The CLK 1 signal from programmable timer 92 is provided as one input to print head motor logic 96, which is shown in more detail in FIG. 7. Print head motor logic 96 also responds to the DIR, EN and RESET signals and provides the appropriate signals to control stepper motor 36 through print head stepper motor drivers 54.

The DIR and EN signals applied to print head motor logic 96 are provided from data latches 98 which responds to the CS4 signal from chip select decode logic 82 and the data bus signals from data bus 78. In addition, data latches 98 provide the EM Enable 1 and EM Enable 2 signals. Upon receipt of the CS4 signal, data latch 98 stores or latches four signals provided from microprocessor 74 over data bus 78 and these latched signals provide the four signals provided by data latch 98.

Figure 6:
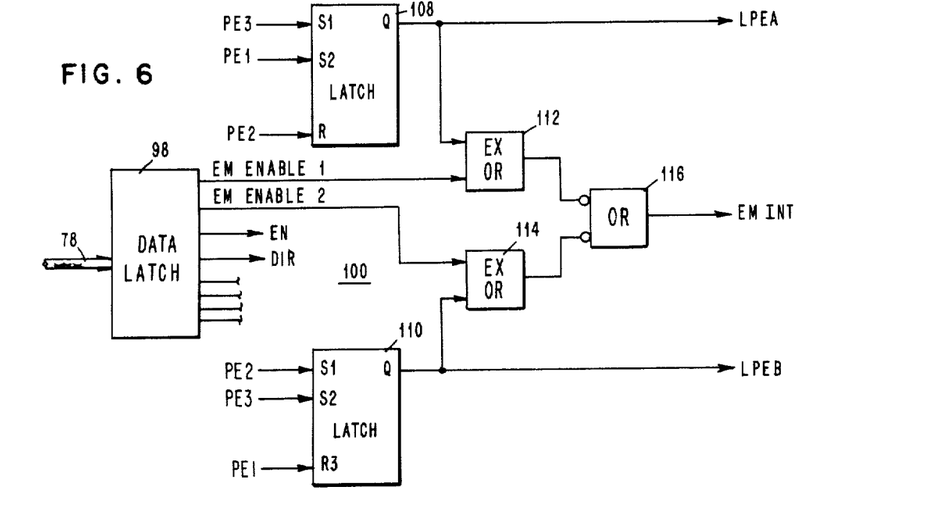
FIG. 6 illustrates the emitter interrupt and status logic shown in FIG. 5.

The EM Enable 1 and EM Enable 2 signals from data latch 98 are provided together with the three print emitter signals, PE1, PE2 and PE3, from print emitter in left margin amplifier 50 to emitter interrupt and status logic 100, which is shown in more detail in FIG. 6. Emitter interrupt and status logic 100 provides the latch print emitter signals LPEA and LPEB to the status input of logic 88. As will be explained hereafter, microprocessor 74 can poll logic 88 to obtain the latch print emitter signals LPEA and LPEB to determine the direction in which print head 22 is moving. In addition, emitter interrupt and status logic 100 provides a print emitter interrupt signal EM INT to the I2 interrupt of microprocessor 74. The emitter interrupt signal EM INT interrupts microprocessor 74 after each detected 0.010 inch movement of print head 22 to cause microprocessor 74 to provide signals to program the second and third portions of programmable timer 92. After the expiration of the programmed times of timer 92, either the CLK 2 or CLK 3 signals are provided through OR gate 94 to interrupt microprocessor 74 to cause appropriate signals to be provided through logic 88 to cause the PRINT DATA signal to actuate the printer wires.

Printer control logic 16 is coupled with I/O controller 18 through data latches 102 and 104. Data latch 102 is enabled by the CS7 signal from chip select decode logic 82 to store the eight bits of data then appearing on data bus 78. The CS7 signal is also applied to I/O controller 18 as a STATUS AVAILABLE signal to indicate that data latch 102 contains an eight bit byte of status information. I/O controller 18 when it is ready to receive the status information provides a GATE STATUS signal back to data latch 102, causing the eight bits of information stored thereby to be provided over I/O bus 106 to I/O controller 18.

Information can also be sent from I/O controller 18 to printer control logic 16 over I/O bus 106 and through data latch 104 to data bus 78. This occurs by I/O controller 18 providing the data on I/O bus 106 while at the same time providing the DATA AVAILABLE signal. The DATA AVAILABLE signal latches the data on I/O bus 106 in data latch 104. Also, the data available signal is provided to the I3 interrupt input of microprocessor 74 to indicate that data is now contained in data latch 104. Microprocessor 74 then can provide appropriate signals to chip select decode logic 82 causing the CS6 signal to be provided, thereby causing the data contained in data latch 104 to be placed on data bus 78. The CS6 signal is also applied to I/O controller 18 as a DATA REQUEST signal to indicate that additional data can be sent to data latch 104.

Referring now to FIG. 6, data latches 98 and emitter interrupt and status logic 100 is shown in more detail. Data latches 98 may be a conventional eight bit input/output data latch such as the Intel 8212 or a 74LS374 circuit, manufactured by Texas Instruments, Inc. of Dallas, Tex. Data latches 102 and 104 may also be the same circuits. In the case of data latch 98, only four of the eight latches are utilized and may be coupled, for instance, to lines D0 through D3 of data bus 78 on the input side. Data latch 98 is enabled to receive data from data bus 78 by the provision of the CS4 signal thereto. The output control signal of data latch 98 is coupled to cause the latch data to appear at the output. Thus, data latch 98 may be programmed by providing appropriate signals on data bus 78 at the time the CS4 signal is provided. The signals provided from data latch 98 are the EM Enable 1 and 2 signals provided to emitter interrupt and status logic 100 and the EN and DIR signals provided to print head motor logic 96, shown in FIG. 7.

Emitter interrupt and status logic 100 includes a pair of SR latches 108 and 110, a pair of exclusive OR gates 112 and 114 and NOR gate 116. Latches 108 and 110 which may be 74LS279 latches manufactured by Texas Instruments, Inc. have two set inputs gated together and a single reset input. Whenever a signal is applied on one of the set inputs of latches 108 and 110, the Q output thereof becomes high, or logic "1". Conversely, whenever a signal is provided to the reset input of latches 108 or 110, the Q output thereof becomes low, or logic "0". The two set inputs to latch 108 are coupled to the print emitter PE1 and PE3 signals and the reset input of latch 108 is coupled to the print emitter PE2 signal. The two set inputs of latch 110 are coupled to the print emitter PE2 and PE3 signals and the reset input of latch 110 is coupled to the print emitter PE1 signal. The Q outout of latch 108 is the latch printer emitter A, or LPEA, signal and the Q output of latch 110 is the latch print emitter B, or LPEB, signal. Both the LPEA and LPEB signals are provided as two of the status inputs to logic 88.

Coupled in this manner, the LPEA signal is logic "1" from the time the PE3 signal occurs until the following PE2 signal occurs; from the time the PE2 signal occurs until the PE3 signal occurs, the LPEA signal is logic "0". The LPEB signal, on the other hand, is logic "0" from the time the PE1 signal occurs until the time the PE2 signal occurs; from the time the PE2 signal occurs until the following PE1 signal occurs, the LPEB signal is logic "1". The sequence in which those signals occur can be utilized by microprocessor 74 to determine the direction of the movement of print head 22 in a known manner.

The LPEA signal is applied as one input to exclusive OR gate 112 and the LPEB signal is applied as one input to exclusive OR gate 114. The other input to exclusive OR gate 112 is the EM Enable 1 signal from data latch 98 and the other input to exclusive OR gate 114 is the EM Enable 2 signal from data latch 98. The outputs from each of exclusive OR gates 112 and 114 are coupled as the two inputs to NOR gate 116, the output of which is the EM INT signal which is applied back to the I2 interrupt input of microprocessor 74. The EM Enable 1 and EM Enable 2 signals are provided from microprocessor 74 through data latch 98 and appear as a complement of the LPEA and LPEB signals, respectively, although they are offset by the time the EM INT interrupt signal is provided. By applying these EM Enable 1 and 2 signals to exclusive OR gates 112 and 114, the outputs thereof become logic "0" pulses each time the respective LPEA or LPEB signals change states. By providing the outputs of exclusive OR gates 112 and 114 through NOR gate 116, the EM INT signal becomes a series of pulses which occur each time print head 22 moves 0.010 inches or, in other words, a pulse is provided for each print emitter signal PE1, PE2 or PE3.

Referring now to FIG. 7, print head motor logic 96 is shown. Print head motor logic 96 includes exclusive OR gates 118 and 120, flip flops 122 and 124 and NAND gates 126, 128, 130, and 132. The DIR signal from data latch 98 is coupled to one of the inputs of each of exclusive OR gates 118 and 120. The Q output from flip-flop 122 is coupled as the second input to exclusive OR gate 120 and the Q output from flip-flop 124 is coupled as the second input to exclusive OR gate 118. The output of exclusive OR gate 118 is coupled to the D input of flip-flop 122 and the output of exclusive OR gate 120 is coupled to the D input of flip-flop 124. The CLK 1 output from programmable timer 92 is coupled to the clock input of each of flip flops 122 and 124 and the RESET signal from microprocessor 74 is coupled to the clear input of each of flip flops 122 and 124. One input of each of NAND gates 126, 128, 130 and 132 is coupled to the EN signal from data latch 98. The Q output from flip-flop 122 is coupled to the other input of NAND gate 126; the Q̄ output from flip-flop 122 is coupled to the second input of NAND gate of 128; the Q output from flip-flop 124 is coupled to the second input of NAND gate 130; and the Q̄ output from flip flop 124 is coupled to the second input of NAND gate 132. The outputs from each of NAND gates 126, 128, 130 and 132 are the conventional A, $\overline{A}$, B and $\overline{B}$ signals and are coupled through print head stepper motor drivers 54 to control the stepper motor 36 in a known manner.

Connected in the manner described, the DIR signal controls the direction in which stepper motor 36 moves print head 22 and the EN signal enables or disables NAND gates 126, 128, 130 and 132, thereby disabling stepper motor 36. The velocity at which stepper motor 36 moves print head 22 is determined by the frequency of the CLK 1 signal provided from programmable timer 92. The start up and slow down of stepper motor 36 is controlled by reprogramming the upper portion of programmable timer 92 during the initial and concluding times that stepper motor 36 moves print head 22. Between the start up and slow down of stepper motor 36, programmable timer 92 is set to generate the CLK 1 signals at a constant frequency, thereby relieving microprocessor 74 of the task of controlling stepper motor 36.

Figure 8:
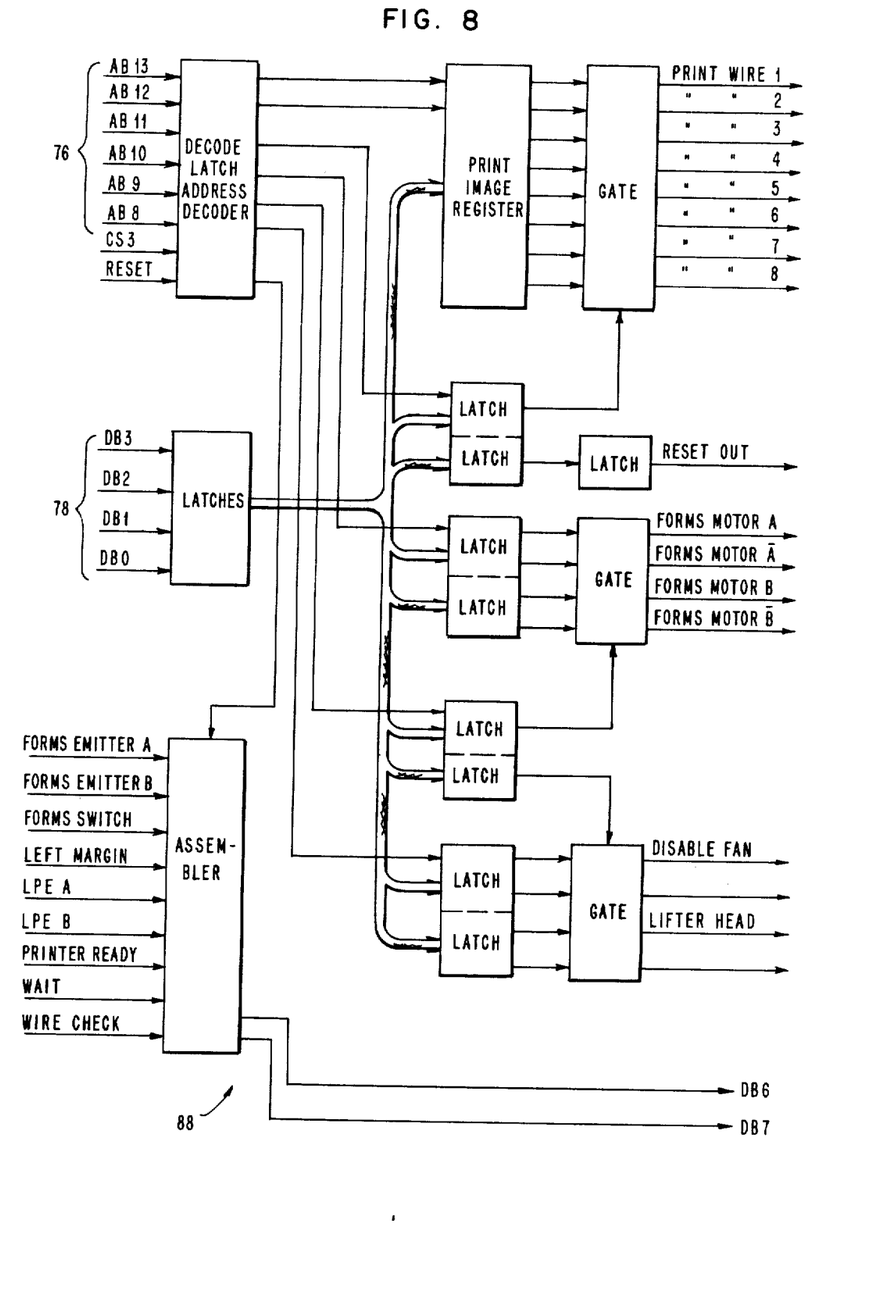
FIG. 8 illustrates the logic shown in FIG. 5.

Referring now to FIG. 8, logic 88 is shown in detail. Logic 88 is substantially identical to similar logic shown and explained in detail in the aforementioned U.S. Pat. No. 4,096,578 and subsequent discussion of this detailed logic will not be repeated herein. The only difference between logic 88 and the logic shown in the above mentioned U.S. Pat. No. 4,096,578 is that logic 88 does not control stepper motor 36. The circuits used in the aforementioned patent to control stepper motor 36 are used in logic 88 to disable the fan whenever print head 22 is in the left margin position and to control the vertical movement of the print head 22 to afford the printing of dots vertically between previously printed dots.

Referring again to FIG. 5, the operation of printer control logic 16 will now be explained. Host processor 20 will determine that printer action is required (e.g. a line of information is to be printed) and will store a device control block (DCB) consisting of eight sixteen bit words, or sixteen bytes, in the dual port storage in I/O controller 18. The first byte of the device control block will then be sent over I/O bus 106 and stored in data latch 104. At the same time, a DATA AVAILABLE signal will be sent from I/O controller 18 to data latch 104 to latch the data on I/O bus 106 in data latch 104. The DATA AVAILABLE signal also interrupts microprocessor 74, indicating that data from host processor 20 is available in data latch 104.

Microprocessor 74 will then cause the CS6 signal to be provided from chip select decode logic 82 and transfer the data stored in data latch 104 into a defined location in random access memory 86. The CS6 signal is also provided to I/O controller 18 as a DATA REQUEST signal and a second byte of data is provided to data latch 104 over I/O bus 106 and the process is repeated. This continues until all sixteen bytes of data defining the eight words of the DEVICE control block have been stored in random access memory 86. The exact makeup of the device control block is explained in the aforementioned U.S. Pat. No. 4,096,578 and the only addition thereto used in the present printer system is information concerning whether and when print head 22 should be vertically moved (lifted).

After all of the characters of the device control block have been transferred from I/0 controller 18 to printer control logic 16, host processor 20, if data is to be printed, sends up to 132 bytes of information to the dual port storage in I/0 controller 18 manifesting in the data to be printed. Again, the information is moved from I/O controller 18 over I/O bus 106 into data latch 104 and from there into random access memory 86 in the manner previously described. After the character information is contained in random access memory 86, or during its transfer from I/O controller 18 to random access memory 86, microprocessor 74 will convert the data which defines the characters to be printed in, for example, conventional ASCII code, into appropriate signals to control the print wires of print head 22 to print those characters. This may be done in a known manner. Thus, random access memory will contain data defining which print wire is to be actuated at what time.

At this point, microprocessor 74 turns on stepper motor 36 by providing appropriate direction DIR and EN signals into data latch 98 and by appropriately programming the first section of programmable timer 92 so that the CLK 1 signal is provided at the appropriate start up intervals. Print head motor logic 96 responds to the EN, DIR and CLK 1 signals by providing the appropriate signals to print head motor drivers 54 which, in turn, provides signals to control print head motor 36. Once stepper motor 36 begins moving print head 22, emitter interrupt and status logic 100 will be detecting the print emitter pulses PE1, PE2 and PE3. For each print emitter pulse detected, the EM INT interrupt signal is provided to interrupt microprocessor 74. In response thereto, microprocessor 74 programs the second and third sections of programmable timer 92 to cause two dots to be printed between each detected emitter signal. The second section of programmable timer 92 is programmed to provide the CLK 2 signal after the time $\Delta t$, shown in FIG. 4, and the third section of programmable timer 92 is programmed to provide the CLK 3 signal after the time of 0.0050 plus $\Delta t$ seconds to cause dots to be printed at the proper place on record medium 32. Thus after each emitter signal, the times to print two dots are programmed in programmable timer 92. Those two dots are the dots following each emitter pulse 64 and each pseudo emitter pulse 66 as shown in FIG. 3. Each time one of the CLK 2 or CLK 3 signals is provided from programmable timer 92 through OR gate 94 to interrupt microprocessor 74, appropriate address bus 76 and chip select decode logic 82 signals are provided causing the next byte of information stored in random access memory 86 to be provided to logic 88 and from there to be provided as the PRINT DATA signals to control the actuation of the print wires. This continues until all of the characters have been printed.

If the device control block indicates that host processor 20 desired to know certain status information, microprocessor 20 would cause logic 88 to read the appropriate status information provided thereto and send it over data bus 78 to data latch 102. Data latch 102 would be enabled to receive this status information by the provision of the CS7 signal which also is provided to I/O controller 18 as the STATUS AVAILABLE signal. I/O controller 18 then provides the GATE STATUS signal to data latch 102 and reads the appropriate status information which then is provided over I/O bus 106. Microprocessor 74 may also desire to know the status information and it can control logic 88 to present the status information in the same manner on data bus 78 which microprocessor 74 can then read.

The inventions herein have been described with respect to a wire matrix printer. It should be understood, however, that the inventions and control logic can as easily be used with any type of matrix printer, such as a thermal printer or an ink jet printer.

What is claimed is:

1. Control means for a printer having a matrix print head which bidirectionally moves across a record medium, said print head printing information on said medium by selective operation of the print elements of said print head, said control means comprising:
   means for providing position signal sequences at periodic interim positions as said print head moves across said medium, the sequence of said position signals manifesting the direction said print head moves;
   interruptable processor means responsive to an interrupt signal for being interrupted to provide a first control signal to selectively operate said print elements after being interrupted and to further provide a second control signal in response to said position signal sequence; and
   decoding means responsive to said position signals and said second control signal for providing said interrupt signal each time said position signal indicates said print head has reached a different interim position.

2. The invention according to claim 1 wherein said position signal providing means includes printer emitter means for providing a signal which changes in a defined manner based upon the direction said print head moves in response to specific interval movement of said print head.

3. The invention according to claim 2 wherein said position signal providing means further includes means responsive to said emitter means signal for providing an interrupt signal to said processor means each time said emitter means signal changes.

4. Control means for a printer having a matrix print head which moves across a record medium, said print head printing information on said medium by selective operation of the print elements of said print head, said control means comprising;
   means for providing position signals at periodic interim positions as said print head moves across said medium;
   interruptable processor means responsive to said position signals for being interrupted to provide a control signal to selectively operate said print elements after being interrupted;
   wherein said position signal providing means includes printer emitter means for providing a signal which changes in response to specific interval movement of said print head;
   wherein said position signal providing means further includes means responsive to said emitter means signal for providing an interrupt signal to said processor means each time said emitter means signal changes;
   wherein said means for providing said interrupt signal further responds to a second control signal from said processor means; and
   wherein said means for providing said interrupt signal includes exclusive OR means responsive to said emitter means signal and to said second control signal, said interrupt signal being provided by said exclusive OR means whenever said emitter means signal changes, said processor means further responding to said interrupt signal to cause a corresponding change in said second control signal so that subsequent interrupt signals are provided by said exclusive OR means upon subsequent emitter means signal changes.

5. In a wire matrix printer having a print head which moves bidirectionally across a record medium, said print head including a plurality of actuatable print wires which can be actuated as said print head moves across said medium, each wire, upon actuation, striking ribbon means against said medium, whereby a mask is printed on said medium, said wire matrix printer further having printer emitter means across which said print head moves for providing a a sequence of signals manifesting each successive incremental movement of said print head, said printer emitter signal sequence being different for different directions that said printer moves, said wire matrix printer further having an improvement of control means comprising:
   programmable processor means having an interrupt input, and
   decoding logic means responsive to said printer emitter signals and to enabling signals provided by said processor means for providing an interrupt signal to said interrupt input each time an incremental movement of said print head is manifested by said emitter signals;
   said processor means being programmed in response to said decoding logic means signal being applied to said interrupt input thereof to provide actuation signals causing the selective actuation of said wires, said actuation signals being provided a desired time after the provision of said decoding logic means signals, said processor means further providing said enabling signals to said decoding logic means in accordance with the then occurring printer emitter signal sequence.

6. The invention according to claim 5 wherein said control means further comprises means for determining said desired time.

7. The invention according to claim 6 wherein said enabling signal is provided having a state related to the then existing value of said print emitter signals after said interrupt signal is applied to said interrupt input.

8. The invention according to claim 5 wherein said control means further comprises means for determining said desired time.

9. The invention according to claim 8 wherein said means for determining said desired time includes a programmable timer which is programmed to provide a signal to a second interrupt input of said processor means said desired time after being programmed.

10. The invention according to claim 9 wherein said programmable timer is programmed to provide a signal to said second interrupt input at a plurality of times after being programmed.

11. The invention according to claim 9 wherein said programmable timer is programmed by said processor means to provide a signal to said second interrupt input at a plurality of times following said interrupt signal being applied to said first mentioned interrupt input.

12. The invention according to claim 11:
   wherein said print head is moved across said medium by a controllable motor, and
   wherein said programmable timer is programmed to control said motor.

13. The invention according to claim 11 wherein said enabling signal is provided having a state related to the then existing value of said print emitter signals after said interrupt signal is applied to said interrupt input.

14. In a wire matrix printer having a print head which moves across a record medium, said print head including a plurality of actuatable print wires which can be actuated as said print head moves across said medium, each wire, upon actuation, striking ribbon means against said medium, whereby a mark is printed on said medium, said wire matrix printer further having printer emitter means across which said print head moves for providing a signal manifesting each successive incremental movement of said print head, said wire matrix printer further having an improvement of control means comprising;

programmable processor means having an interrupt input, and decoding logic means responsive to said printer emitter signals for providing a signal to said interrupt input each time an incremental movement of said print head is manifested by said emitter signals;

said processor means being programmed in response to said decoding logic means signal being applied to said interrupt input thereof to provide actuation signals causing the selective actuation of said wires, said actuation signals being provided a desired time after the provision of said decoding logic means signal;

wherein said control means further comprises means for measuring said desired time;

wherein said means for measuring said desired time includes a programmable timer which is programmed to provide a signal to a second interrupt input of said processor means said desired time after being programmed;

wherein said programmable timer is programmed by said processor means to provide a signal to said second interrupt input at a plurality of times following said decoding logic means signal being applied to said first mentioned interrupt input;

wherein said decoding means logic further responds to a control signal provided by said processor means, said control signal having a state related to the value of said print emitter signals after said decoding means logic signal is applied to said interrupt input; and wherein said decoding means logic includes exclusive OR means responsive to said print emitter means signal and to said control signal; said first interrupt signal being provided by said exclusive OR means whenever said print emitter means signal manifests an incremental movement of said print head, said processor means responding to said first interrupt signal to cause a change in said control signal so that subsequent interrupt signals are provided by said exclusive OR means for subsequent print emitter means signals.

15. Control means for a printer having a matrix print head which moves across a record medium, said print head printing information on said medium by selective operation of the print elements of said print head, said control means comprising:

means for providing positioning signals at periodic interim positions as said print head moves across said medium;

programmable timer means which provides a signal after the expiration of a time programmed therein; and processor means responsive to said positioning signals for programming said timer means to provide signals after a given time to selectively cause the operation of said print elements, said timer means signal being coupled to interrupt said processor means, said processor means providing signals to cause said print elements to be operated in response to said timer means signal.

16. The invention according to claim 15:
wherein said print head is capable of moving across said medium in either one of two directions; and
wherein timer means is programmed so that said print elements are operated to print at substantially the same point on said medium regardless of the direction of movement of said print head.

17. The invention according to claim 16 wherein said printer is a wire matrix printer and said operated print elements are actuated print wires.

18. The invention according to claim 16 wherein said printer is a wire matrix printer and said operated print elements are actuated print wires.

19. The invention according to claim 16 wherein said timer means is further programmed by said processor means to control the velocity at which said print head moves.

20. The invention according to claim 19
wherein said print elements are capable of being operated at a plurality of desired positions between each interim position; and
wherein said timer means includes a portion for each of said plurality of desired positions, each of said timer means portions being individually programmed by said processor means upon said processor means responding to said each positioning signals.

21. The invention according to claim 20 wherein said timer means includes an additional portion for being programmed to control the velocity of said print head.

22. The invention according to claim 15 wherein said timer means is further programmed by said processor means to control the velocity at which said print head moves.

23. In a wire matrix printer having a print head which moves across a record medium, said print head including a plurality of actuatable print wires which can be actuated as said print head moves across said medium, each wire, upon actuation, striking ribbon means against said medium, whereby a mark is printed on said medium, said wire matrix printer further having printer emitter means across which said print head moves for providing a signal manifesting each successive incremental movement of said print head, said wire matrix printer further having an improvement of control means comprising:

programmable processor means having an interrupt input; and programmable timer means responsive to programming signals provided thereto from said processor means for being set to provide an interrupt signal to said interrupt input a desired time after being programmed;

said processor means being programmed to provide actuation signals in response to said interrupt signal, said actuation signals causing the selective actuation of said wires.

24. The invention according to claim 23 wherein said processor means responds to said printer emitter signals by programming said timer means.

25. The invention according to claim 24 wherein said timer means responds to programming signals from said processor means for being set to provide a plurality of interrupt signals to said interrupt input at a plurality of desired times after being programmed.

26. The invention according to claim 25 wherein said timer means further is programmable to control the movement of said print head.

27. The invention according to claim 26 wherein said print head moves under the control of a motor; and
wherein said timer means includes a plurality of individually programmable portions, one of which is dedicated to being programmed as an oscillator for controlling said motor and others of which are dedicated to being programmed to provide a signal a certain programmed time being programmed for interrupting said processor means.

28. The invention according to claim 24 wherein said processor means is interrupted by said print emitter signals to program said timer means.

* * * * *